| United States Patent [19] | [11] | 4,101,493 |
|---|---|---|
| Nakagawa et al. | [45] | Jul. 18, 1978 |

[54] CROSSLINKING EMULSION

[75] Inventors: Teruo Nakagawa; Takahisa Ogasawara; Hidemaro Tatemichi, all of Nagoya, Japan

[73] Assignee: Toagosei Chemical Industry Co., Ltd., Tokyo, Japan

[21] Appl. No.: 704,819

[22] Filed: Jul. 13, 1976

[30] Foreign Application Priority Data

Jul. 17, 1975 [JP] Japan ................... 50-86717

[51] Int. Cl.$^2$ ............................................. C08L 33/08
[52] U.S. Cl. .......................... 260/29.6 R; 204/159.17; 204/159.19; 260/29.6 RB; 260/29.7 UP; 260/861; 260/878 R; 260/897 B
[58] Field of Search .................. 260/29.6 R, 29.7 UP, 260/29.6 RB, 861, 878 R, 897 B; 204/159.17, 159.19

[56] References Cited

U.S. PATENT DOCUMENTS

| Re. 27,444 | 7/1972 | Will | 260/29.7 UP |
|---|---|---|---|
| 3,455,801 | 7/1969 | D'Alelio | 204/159.16 |
| 3,888,830 | 6/1975 | Ogasawara et al. | 204/159.19 |
| 3,993,710 | 11/1976 | Alberts et al. | 260/862 |

*Primary Examiner*—M. J. Welsh
*Attorney, Agent, or Firm*—Cooper, Dunham, Clark, Griffin & Moran

[57] ABSTRACT

An emulsion of a crosslinking type comprises an oligoester-(meth)acrylate having at least two (meth)acryloyl groups in a molecule, a molecular weight of not more than 1000 per one (meth)acryloyl group, and a boiling point at a normal pressure of at least 200° C and a polymer emulsion of an oil-in-water type.

10 Claims, No Drawings

CROSSLINKING EMULSION

BACKGROUND OF THE INVENTION

1. Field of the Invention

The present invention relates to an emulsion of a crosslinking type comprising a polymer and an oligoester-(meth)acrylate as a crosslinking agent. In the subject disclosure, acrylate and/or methacrylate are referred to as "(meth)acrylate", acryloyl group and/or methacryloyl group are referred to as "(meth)acryloyl group", and acrylic acid and methacrylic acid are referred to as "(meth)acrylic acid".

2. Description of the Prior Art

Heretofore polymers, such as vinyl polymers, have been dissolved in or mixed with an oligoester-(meth)acrylate and irradiated with an ionizable radiation or heated with a peroxide for cure by crosslinking. However, these curing methods give a very high viscosity to the composition or yield a solid composition, and therefore, properties such as handling, coating procedure and the like are poor. From the point of view of solubility, the polymer employed has been restricted to that of a relatively low molecular weight and thereby the resulting cured matter has only a limited range of physical properties, and requires a lot of an organic solvent or the monomer for dilution.

On the other hand, a polymer emulsion of an oil-in-water type obtained by an emulsion polymerization is a water dispersion of a polymer of a very high molecular weight. A coating formed from the high polymer has generally a high flexibility and a good adherability, and since the emulsion contains water as a dispersion medium air pollution problems, such as may be due to evaporation of organic solvents, are avoided. However, it is difficult to obtain a high hardness because a high hardness tends to deteriorate a film-shapeability and further, the high polymer is not a crosslinking type and therefore the solvent resistance is poor. In view of the foregoing, many attempts have been made to crosslink the emulsion.

In case of conventional polymer emulsions of a crosslinking type, when an acrylic acid ester is subjected to an emulsion polymerization, a hydroxymethylated amido group or a carbonyl group is introduced into the polymer side chain by copolymerizing with a polymerizable monomer having a hydroxymethylated amido group or a carbonyl group, and the polymerization mixture is heated, after the dispersion medium is evaporated, to cause a self crosslinking or heat-crosslinking by using melamine as a crosslinking agent. Therefore, there are the following disadvantages.

(1) Formaldehyde is generated upon the heat crosslinking giving rise to a possible environmental pollution problem.

(2) The heating temperature is high and the heating time is long.

(3) Unreacted hydroxymethylated amido group or carbonyl group remaining after the heat reaction lowers a water resistance of the crosslinked polymer.

(4) Upon emulsion polymerization, a particular polymerizable monomer having functional groups for crosslinking should be used.

(5) Increasing a hardness of the coated film is difficult.

The subject invention eliminates the above disadvantages of a polymer emulsion of an oil-in-water type, and in accordance therewith it has been found that the oligoester-(meth)acrylates which are inherently oil-soluble deposit on emulsion particles, and the emulsion particles and the oligoester-(meth)acrylates are mutually dissolved without destroying the polymer emulsion of an oil-in-water emulsion by a simple procedure, and the resulting emulsion of a crosslinking type shows excellent synergistic effects as shown below.

SUMMARY OF THE INVENTION

According to the present invention, there is provided an emulsion of a crosslinking type which comprises an oligoester-(meth)acrylate having at least two (meth)acryloyl groups in a molecule, a molecular weight of not more than 1000 per one (meth)acryloyl group, and a boiling point at a normal pressure of at least 200° C, and a polymer emulsion of an oil-in-water type.

According to another aspect of the present invention, there is provided a process for producing the emulsion of a crosslinking type comprising mixture with stirring an oligoester-(meth)acrylate having at least two (meth)acryloyl groups in a molecule, a molecular weight of not more than 1000 per one (meth)acryloyl group, and a boiling point at a normal pressure of at least 200° C, and a polymer emulsion of an oil-in-water type, or mixing the oligoester-(meth)acrylate in a form of an oil-in-water type emulsion and a polymer emulsion of an oil-in-water type.

An object of the present invention is to provide an emulsion of a crosslinking type which can be crosslinked at a lower temperature and in a shorter time than when a conventional crosslinking agent is employed.

Another object of the present invention is to provide an emulsion of a crosslinking type which does not generate obnoxious gases such as formaldehyde upon a crosslinking reaction.

A further object of the present invention is to provide an emulsion of a crosslinking type capable of giving a high hardness of the crosslinked cured matter such as a coated film.

Still another object of the present invention is to provide an emulsion of a crosslinking type in which the polymer may not have a particular functional group for crosslinking.

A still further object of the present invention is to provide an emulsion of a crosslinking type which can yield a cured material having excellent physical and chemical properties such as flexibility, adhesivity, chemical resistance and water resistance.

Still another object of the present invention is to provide an emulsion of a crosslinking type capable of being cured by various means such as an ionizing radiation, an ultraviolet ray irradiation as well as heating.

A still further object of the present invention is to provide an emulsion of a crosslinking type which can be handled as an aqueous emulsion and thereby, can be of a low viscosity and does not cause an environmental pollution problem.

As to the crosslinking of emulsion particles by polyfunctional monomers, it is known that in producing cross-linked rubber particles, a polyfunctional monomer is added to cause polymerization upon or after an emulsion polymerization and the crosslinking is effected at a state of particles (published Japanese Patent Publication Nos. 3941/1970, 38422/1970 and 11030/1971), but this technique is quite different from the subject invention.

DESCRIPTION OF THE PREFERRED EMBODIMENTS

The emulsion according to the present invention can be crosslinked even if the polymer does not have any functional group for crosslinking. The mechanism of crosslinking in such case is not yet clear, but it may be as follows. When an active energy ray irradiation or heating causes a radical polymerization of the oligoester-(meth)acrylate, free radicals are formed and abstract the hydrogen from the polymer chain to cause the crosslinking. The emulsion of the present invention can be sufficiently crosslinked even in the absence of a polymerizable radical functional group in the polymer and the polymerization reaction is difficult from a condensation reaction so that undesirable by-product such as formaldehyde is not produced.

The oligoester-(meth)acrylate, a crosslinking agent in the emulsion of the present invention, has at least two (meth)acryloyl groups in a molecule, a molecular weight of not more than 1000 per one (meth)acryloyl group, and a boiling point at a normal pressure of at least 200° C.

The oligoester-(meth)acrylate is not always a single compound depending upon the process for production and the kind of the oligoester-(meth)acrylate. It is known that in most cases an oligoester-(meth)acrylate is a mixture of various such compounds. Since in case of a mixture it is not only complicated, but also difficult to separate each constituent compound thereof and determine the actual structural formula, it is generally accepted that the mixture is treated as a single compound as in case of a polymer composed of polymers each of which has a degree of polymerization different from that of others. Consequently, in representing the chemical name, the structural formula of the oligoester-(meth)acrylate or the oligoester-(meth)acrylate is used and the average chemical formula is hypothesized by the chemical reaction equation expected on the basis of the starting materials and the molar ratio and the mixture is represented by the microscopic theoretical compound thus hypothesized (see for example, published Japanese Patent Laid Open Nos. 110780/1974 and 128088/1974).

Accordingly, in the present invention, the name, molecular weight, number of (meth)acryloyl group in one molecular, ratio of acryloyl group to methacryloyl group, presence, absence or numbers of hydroxy group and carboxy group, and molecular weight per one (meth)acryloyl group of the oligoester-(meth)acrylate are represented or calculated as average ones based on the theoretical hypothesized compound following the abovementioned way of expression.

Representative oligoester-(meth)acrylates used in the present invention are as shown in (a) – (j) (infra). They may be used alone or in combination.

A preferred oligoester-(meth)acrylate is liquid at a normal temperature and this includes a liquid material obtained by dissolving an oligoester-(meth)acrylate which is substantially solid or highly viscous at a normal temperature in an oligoester-(meth)acrylate of a low viscosity. When the molecular weight of an oligoester-(meth)acrylate is too high, the viscosity becomes high and the handling is not easy. Therefore, a molecular weight of not more than 10,000 is preferable, and especially preferred not more than 5,000.

The molecular weight per one (meth)acryloyl group should not be higher than 1000 from the point of view of the crosslinking curing speed, and is preferably 90 – 1000, more preferably 200 – 600.

When the boiling point of the oligoester-(meth)acrylate is too low, it is lost as a vapor and causes an environmental pollution problem due to the odor. Therefore, the boiling point at a normal pressure is at least 200° C, and preferably at least 250° C.

(a) Poly(meth)acrylates derived from an aliphatic, alicyclic, aromatic or araliphatic polyhydric (e.g. di- to hexa-hydric) alcohol and a polyalkyleneglycol:

(b) The poly(meth)acrylates may be usually prepared by esterification of a (meth)acrylic acid with a polyhydric alcohol in the presence of a dehydration esterifying catalyst such as sulfuric acid and, if desired, in the presence of a solvent.

The starting materials for synthesizing the poly(meth)acrylates are illustrated below.

(Meth)acrylic acids, per se, may of course be used; and (meth)acrylic acid derivatives, such as lower alkyl esters of (meth)acrylic acid and halides of (meth)acrylic acid, which are capable of causing an esterifying reaction through interesterifying and addition reactions, may also be used as an equivalent compound to (meth)acrylic acid. Thus in this specification, said derivatives are intended to be included in the expression "(meth)acrylic acid".

Polyhydric alcohols which may be used are aliphatic, alicyclic, aromatic and araliphatic ones as well as polyalkylene glycols containing in the molecule as ethereal structure such as that obtained by dehydration condensing at least one kind of said polyhydric alcohols. They include the following.

[Dihydric alcohols]

Ethylene glycol, propylene glycol, butanediol(1,3- 1,4- or 2,3-), pentamethylene glycol, hexamethylene glycol, heptamethylene glycol, octamethylene glycol, nonamethylene glycol, decamethylene glycol, neopentyl glycol, hydrogenated bisphenol A, cyclohexane-1,4-dimethanol, m-xylidene glycol, diethanolamine, dibromoneopentyl glycol, polybutadienediol, 1,4-cyclohexanediol, chloropropylene glycol, 3-methylpentanediol, 2,2-diethylpropanediol, 2-ethyl-1,4-butanediol, 2,2-diethylbutanediol-1,3, 4,5-nonandiol, 2-ethylhexanediol (-1,3 or -1,6), diethylene glycol, triethylene glycol, polyethylene glycol, dipropylene glycol, polypropylene glycol, diglycol, and 2,2-dihydroxybistrimethylene glycol.

[Trihydric and higher alcohols]

Glycerine, trimethylolmethane, trimethylolethane, trimethylolpropane, 1,2,6-hexanetriol, tris(2-hydroxyethyl) isocyanurate, xylitol, trimethanolamine, triethanolamine, dulcitol; mannitol, pentaerithritol, sorbitol, erithritol, arabitol.

In addition, the epoxy groups of epoxy compounds are cleavage reacted with carboxyl groups to give the corresponding ester compounds similar to those which would be produced by reacting with a polyhydric alcohol. Thus the epoxy compounds may be used in substitution for polyhydric alcohols and, therefore, they are intended to be included in the expression "polyhydric alcohols" in this specification. The epoxy compounds which may be substituted for dihydric alcohols, include monoepoxides such as ethylene oxide, propylene oxide, epichlorohydrin, methylepichlorohydrin, allylglycidyl ether, and 3-hydroxypropylene oxide. Diepoxy prepolymers which may be used in substitution for tetrahydric alcohols, include glycerine di(meta)glycidyl ether, polyethylene glycol di(meta)glycidyl ether, polypropylene glycol di(meta)glycidyl ether, bisphenol A di(meta)glycidyl ether, di(meta)glycidyl ether of bisphenol A dioxypolyethylene glycol ether, tetrahydrophthalic acid di(meta)glycidyl ester, and adipic acid di(3,4-epoxycyclohexylmethyl) ester. Furthermore, triepoxy prepolymers such as glycerine tri(meta)glycidyl ether, may be used in place of hexahydric alcohols.

The suitable polyolpoly(meth)acrylates include di(meth)acrylates of alkanediol, such as ethylene glycol di(meth)acrylate, propylene glycol di(meth)acrylate, 1,3-butanediol di(meth)acrylate and 1,4-butanediol di(meth)acrylate; polyalkylene glycol di(meth)acrylates such as diethylene glycol di(meth)acrylate, triethylene glycol di(meth)acrylate, tetraethylene glycol di(meth)acrylate and dipropylene glycol di(meth)acrylate; tri(meth)acrylates of alkanetriols, such as glycerine tri(meth)acrylate, trimethylolmethane tri(meth)acrylate, trimethylolethane tri(meth)acrylate, trimethylolpropane tri(meth)acrylate and 1,2,6-hexanetriol tri(meth)acrylate; pentaerithritol tetra(meth)acrylate and erithritol tetra(meth)acrylate.

(b) Poly(meth)acrylates obtained by the addition of an alkylene oxide to aliphatic, alicyclic, araliphatic or aromatic polyhydric (e.g. di- to hexahydric) alcohol:

Poly(meth)acrylate produced by the addition of ethylene oxide or propylene oxide to a polyhydric alcohol such as trimethylol propane, pentaerythritol, glycerine, bisphenol A and the like. For example, bisphenol A dioxyethylether is preferable.

(c) Poly(meth)acryloyloxyalkyl phosphates:

Obtained by the reaction of a hydroxy group-containing (meth)acrylate with phosphorus pentoxide. For example, poly(meth)acryloyloxyethyl phosphate, and poly(meth)acryloyloxypropyl phosphate.

(d) Polyester poly(meth)acrylates:

Polyester poly(meth)acrylates may be produced by esterifying (meth)acrylic acids, polyhydric alcohols and polybasic carboxylic acids. The main component is considered to be poly(meth)acrylate of polyhydric alcohol of a polyester type.

For example, there may be mentioned di(meth)acrylate of a polyester diol derived from succinic acid and ethyleneglycol, di(meth)acrylate of a polyester diol derived from maleic acid and ethyleneglycol, di(meth)acrylate of a polyester diol derived from phthalic acid and diethyleneglycol, di(meth)acrylate of a polyester diol derived from tetrahydrophthalic acid and diethyleneglycol, poly(meth)acrylate of polyester diol derived from adipic acid and triethylene glycol, poly(meth)acrylate of polyester polyol derived from tetrahydrophthalic acid and trimethylol propane, and poly(meth)acrylate of a polyester polyol derived from tetrahydrophthalic acid and pentaerythritol.

Among these polyester poly(meth)acrylates, those of aliphatic or alicyclic polybasic carboxylic acid series are better than those of aromatic polybasic carboxylic acid series as to weatherability and strength of the resulting crosslinked cured products.

The polyester poly(meth)acrylates may be prepared by various methods, for example, co-esterifying, in one step, a mixture containing the three components, i.e. (meth)acrylic acid, polyhydric alcohol and polybasic carboxylic acid, in the presence of a dehydration esterifying catalyst such as sulfuric acid, and if desired, in the presence of a solvent; esterifying a (meth)acrylic acid with a polyhydric alcohol first and then esterifying the resulting product with a polybasic acid; or esterifying a polybasic acid with a polyhydric alcohol first and then esterifying the resulting product with (meth)acrylic acid.

The amount ratio of the three components are generally selected in such a manner that hydroxy equivalent in the polyhydric alcohol is equal to total carboxy equivalents of the (meth)acrylic acid and the polybasic acid. However, if desired, it is possible to effect the esterification with the amount ratio resulting in excess carboxy or excess hydroxy group. Such esterification is often employed in the following cases.

(i) When low boiling point starting materials such as (meth)acrylic acid and a lower polyhydric alcohol are employed and they escape from the reaction system during the esterification reaction, excess amounts of the low boiling point starting materials are used to compensate the loss of the materials.

(ii) The characteristics of the hydroxy or carboxy groups remaining in the resulting polyester poly(meth)acrylate are utilized for improving physical and chemical properties such as adhesivity, chemical resistance, water resistance and the like of the cured product.

(iii) Reactivity of the remaining hydroxy or carboxy group is utilized for modifying the product by reacting with isocyanates, epoxy compounds, acid chlorides and other compounds.

Such polyester poly(meth)acrylates obtained by the esterification with excess one component may also be used in the subject invention.

As starting materials for preparing the polyester poly(meth)acrylate, there may be used (meth)acrylic acids and polyhydric alcohols as mentioned in (a) and (b) above.

Polycarboxylic acids which may be used, are as follows.

[Dicarboxylic acids]

Phthalic, isophthalic, terephthalic, tetrahydrophthalic, hexahydrophthalic, Himic, Endo, tetrachlorophthalic, tetrabromophthalic, Het, methylhexahydrophthalic, polybutadienecarboxylic, oxalic, malonic, succinic, glutaric, adipic, sebacic, dodecanedioic, maleic, fumaric, itaconic, trimethyladipic, methyleneglutaric, ethylmalonic, acetylenedicarboxylic, methylmaleic, methylfumaric, thiodiglycolic, thiodivalerianic, sulfonyldiacetic, sulfonyldivalerianic, 1,4,5,6,7,7-hexabromo-endo-5-norbornene-2,3-dicarboxylic, 2,4-benzophenonedicarboxylic, bisphenol A diacetic, resorcinolacetic, trans-1,4-cyclohexenedicarboxylic, 1,3- (or 1,4-)tetrahydrophthalic, 1,3- (or 1,4)-hexahydrophthalic, α-methylitaconic, α,α-dimethylitaconic, α-ketoglutaric, 2,2- (or 2,3-) dimethylsuccinic, 2-methylsuccinic, hexylsuccinic, pimelic, suberic, azelaic, 3,3- (or 2,2-) dimethylglutaric, 3,3- (or 2,2-) diethylglutaric, 1,1-cyclobutanedicarboxylic, diglycolic, malic, cyclopentanedicarboxylic, dihydrophthalic, cyclohexanedicarboxylic, α-methylglutaric, and halogenated tetrahydrophthalic acids.

[Tricarboxylic and higher carboxylic acids]

Trimellitic, methylcyclohexenetricarboxylic, aconitic, butanetricarboxylic, tris(2-carboxyethyl) isocyanurate, naphthalenepolycarboxylic, bicyclooctanetetracarboxylic, pyromellitic, butanetetracarboxylic and benzoltetracarboxylic acids.

In addition, the anhydrides, acylhalides and the like of the aforesaid polycarboxylic acids are capable of reaction in the same manner as the polycarboxylic acids and may therefore be used in this invention. Accordingly, such derivatives of the polycarboxylic acids are intended to be included in the expression "polycarboxylic acids" in this specification.

Some examples of polyester poly(meth)acrylate used for the emulsion of the subject invention are:
poly(meth)acrylate of polyesterpolyol of tetrahydrophthalic and and trimethylolpropane,
poly(meth)acrylate of polyesterpolyol of tetrahydrophthalic acid and glycerine,
poly(meth)acrylate of polyesterpolyol of tetrahydrophthalic acid and pentaerythritol,
poly(meth)acrylate of polyesterpolyol of tetrahydrophthalic acid, pentaerythritol and ethylene glycol,
poly(meth)acrylate of polyesterpolyol of tetrahydrophthalic acid, pentaerythritol and diethylene glycol,
poly(meth)acrylate of polyesterpolyol of phthalic acid and pentaerythritol,
poly(meth)acrylate of polyesterpolyol of adipic acid and pentaerythritol,
poly(meth)acrylate of polyesterpolyol of Het acid and trimethylolethane,
poly(meth)acrylate of polyesterpolyol of trimellitic acid and diethylene glycol,
poly(meth)acrylate of polyesterpolyol of pyromellitic acid and diethylene glycol,
and
poly(meth)acrylate of polyesterpolyol of 6-methylcyclohexane-1,2,3-tricarboxylic acid and ethylene glycol.

(e) Epoxy poly(meth)acrylates:

Epoxy poly(meth)acrylates may be prepared by reacting an epoxy resin having at least two epoxy groups per molecule with substantially equivalent molar amount of (meth)acrylic acid, a (meth)acrylate having a carboxy group, or a mixture of (meth)acrylic acid or a (meth)acrylate having a carboxy group and a polybasic acid in the presence or absence of a catalyst. In addition, there is a method of reacting a (meth)acrylate containing an epoxy group with a polybasic carboxylic acid.

As the epoxy resin, there may be used an epoxy resin of a bisphenol A diglycidyl ether type, glycerine diglycidyl ether type, polyalkyleneglycol diglycidyl ether type, polybasic acid diglycidyl ester type, or cyclohexene oxide type.

As the (meth)acrylate containing an epoxy group, there may be used glycidyl (meth)acrylate.

Some examples of the epoxy poly(meth)acrylates are as shown below.

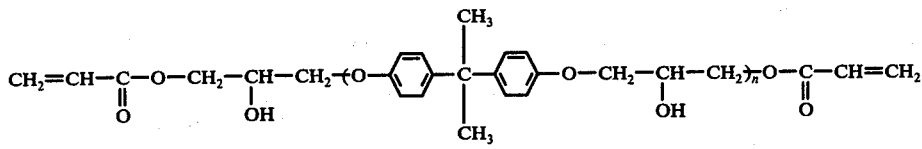
where n is an integer of at least 1;

1)

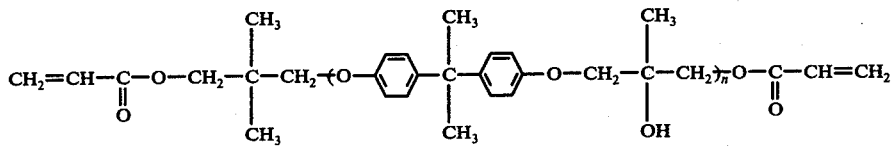
where n is an integer of at least 1;

2)

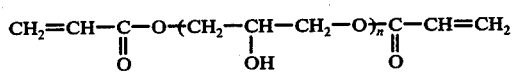
where n is an integer of at least 3;

3)

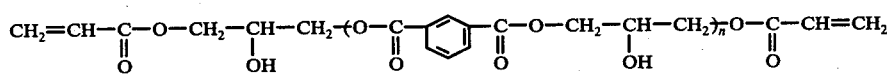
where n is an integer of at least 1;

4)

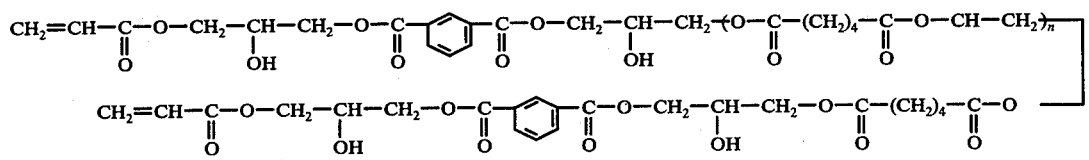
where n is an integer of at least 1;

5)

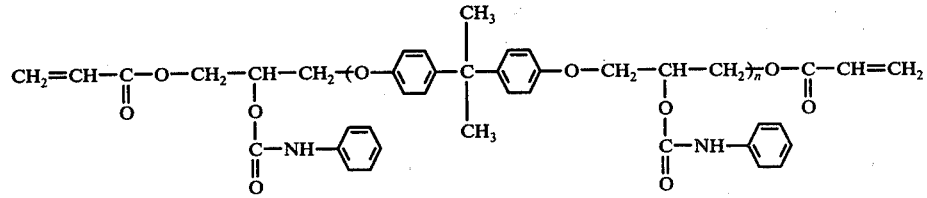
where n is an integer of zero or more;

6)

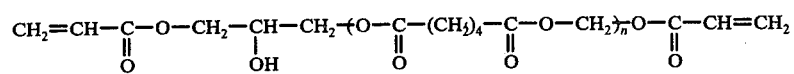
where n is an integer of at least 1;

7)

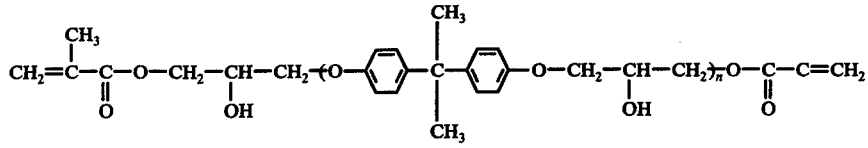

8)

where n is an integer of at least 1;

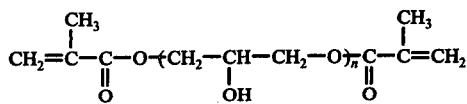

9)

where n is an integer of at least 2;

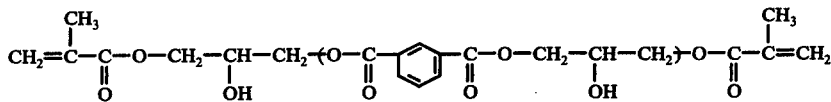

10)

where n is an integer of at least 1; and

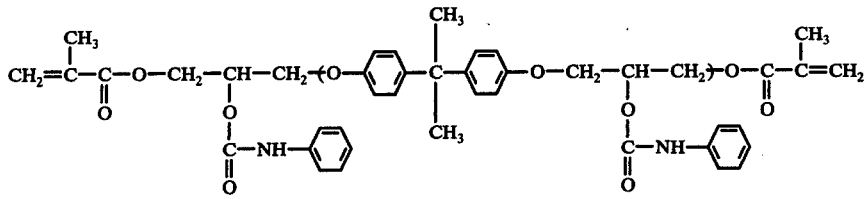

11)

where n is an integer of zero or more.

(f) Polyurethane poly(meth)acrylates:

Polyurethane poly(meth)acrylates have a structure of a (meth)acrylate of a polyhydric alcohol having a polyurethane bond unit in the main chain, and may be prepared by the following methods (i) – (iii).

(i) Reacting a polyhydric alcohol of a polyurethane type with (meth)acrylic acid or (meth)acrylic chloride or a (meth)acrylate having a carboxy group.

(ii) Reacting a polybasic acid of a polyurethane type with a (meth)acrylate having a hydroxy group or epoxy group.

(iii) Reacting the above mentioned polyhydric alcohol, polyhydric alcohol of a polyurethane type, and the above mentioned polybasic acid, polybasic acid of a polyurethane type with a (meth)acrylate having a hydroxy group together with a polyisocyanate.

The polyhydric alcohol of a polyurethane type may be prepared, for example, by the following reaction of a polyhydric alcohol with a diisocyanate.

(n+1)R(OH)$_2$+nR'(NCO)$_2$→
HO[R—O—OC—NH—R'—NH—CO—O]$_n$-
R—OH

The polybasic acid of a polyurethane type may be prepared, for example, by the following reaction of the above mentioned polyhydric alcohol of a polyurethane type with a polybasic acid anhydride.

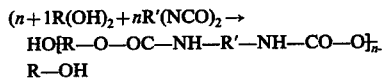

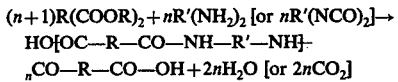

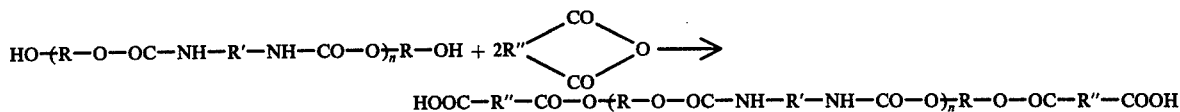

As the polyisocyanate, there may be used tolylene diisocyanate, hexamethylene diisocyanate, naphthalene diisocyanate and other polyisocyanates.

It is possible to prepare an oligoester(meth)acrylate having a structure that a part of polyhydric alcohols, polybasic acids and polyepoxides as used in (a)–(e) above is replaced by a diisocyanate, and such oligoester(meth)acrylate also can be used as an ingredient of the emulsion of the present invention.

As examples of the polyurethane poly(meth)acrylate, there may be mentioned addition reaction products of 2-hydroxyethyl(meth)acrylate or 2-hydroxypropyl(meth)acrylate and a diisocyanate, and addition reaction products of 2-hydroxyethyl(meth)acrylate, a diisocyanate and a dihydric alcohol.

(g) Polyamide poly(meth)acrylates:

Polyamide poly(meth)acrylates have a structure of a (meth)acrylate of a polybasic alcohol having a polyamide bond unit in the main chain, and may be prepared by the following methods (iv) and (v).

(iv) Reacting a polyhydric alcohol of a polyamide type with (meth)acrylic acid, (meth)acrylic chloride or a (meth)acrylate having a carboxy group.

(v) Reacting a polybasic acid of a polyamide type with a (meth)acrylate having a hydroxy or epoxy group.

The polybasic acid of a polyamide type as a starting material in the above preparation may be produced by the following reaction of a polybasic acid with a polyamine or polyisocyanate.

(n+1)R(COOR)$_2$+nR'(NH$_2$)$_2$ [or nR'(NCO)$_2$]→
HO[OC—R—CO—NH—R'—NH]-
$_n$CO—R—CO—OH+2nH$_2$O [or 2nCO$_2$]

As the polyamine used for the preparation of the polybasic acid of a polyamide type, there may be used, for example, ethylene diamine, hexamethylene diamine, triethylene tetramine and the like.

The polyhydric alcohol of a polyamide type may be prepared by the following reaction of the above mentioned polybasic acid of a polyamide type with an alkanol amine.

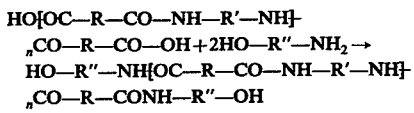

An example of the product is a reaction product obtained by the reaction of 2-hydroxyethyl(meth)acrylate or glycidyl(meth)acrylate with a polybasic carboxylic acid of a polyamide type obtained by reacting ethylene diamine with phthalic acid.

(h) Polysiloxane poly(meth)acrylates:

Polysiloxane poly(meth)acrylates have a structure of a (meth)acrylate of a polyhydric alcohol having a polysiloxane bond unit in the main chain, and may be prepared by reacting a (meth)acrylic acid or a hydroxy-containing (meth)acrylate with a polyhydric alcohol having a polysiloxane bond unit. For example, polysiloxane poly(meth)acrylate can be obtained by the esterification of a cyclic siloxane of hydroxy function with hydroxyethyl methacrylate.

(i) Low molecular weight polymers of vinyl series or diene series having a (meth)acryloyloxy group at the side chain and/or end group:

The molecular weight polymers having a structure of a low molecular weight polymer of vinyl series or diene series having a (meth)acryloyloxy group bonded to the side chain and/or end group through an ester bond, urethan bond, amido bond, ether bond or the like.

Suitable low molecular weight polymers may be produced by reacting a low polymer having a hydroxy, carboxy, epoxy or the like at the side chain or end group with a (meth)acrylic acid, (meth)acrylate containing a carboxy groups, (meth)acrylate containing a hydroxy group, (meth)acrylate containing an epoxy group, (meth)acrylate containing an isocyanate group, (meth)acrylate containing an amino group or the like reactive to the above mentioned group at the side chain or end group.

For example, there may be mentioned reaction products produced by reacting glycidyl(meth)acrylate with a copolymer of (meth)acrylic acid and another vinyl monomer.

As the molecular weight of oligoester-(meth)acrylate of this type increases, the viscosity tends to become high or it tends to become a solid-like material. Therefore, as described later, it is desirable that the oligoester-(meth)acrylate be dissolved in a liquid-like, low viscosity oligoester-(meth)acrylate and/or other (meth)acrylate monomer and used, or the oligoester-(meth)acrylate of a low molecular weight (usually not higher than 3000 of number average molecular weight) in a liquid state is used.

(j) Modified oligoester-(meth)acrylates of an (a)–(i) type as described above:

The modified oligoester-(meth)acrylates may be obtained by modifying at least a part of the hydroxy or carboxy groups remaining in each oligoester-(meth)acrylate with an acid chloride, acid anhydride, isocyanate or epoxy compound reactive to said group.

The modified oligoester-(meth)acrylates may be usually prepared by adding the above mentioned modifier to an oligoester-(meth)acrylate and heating or allowing to stand at room temperature in the presence or absence of a catalyst.

The polyisocyanates as mentioned in (f) and (g) above, the epoxy resins are mentioned in (e) above and acid chlorides such as acrylic chloride, acetic chloride and the like, and acid anhydrides such as acetic anhydride, maleic anhydride and the like.

Among (a)–(j), where is preferred (d).

Among the above mentioned oligoester-(meth)acrylates, epoxy poly(meth)acrylates, oligoester-(meth)acrylates of (f) to (j) and a part of the polyester poly(meth)acrylates are usually of a high viscosity. Therefore, they are inconvenient in handling and agitation upon mixing with the emulsion of the present invention. In such a case, the oligoester-(meth)acrylates may be diluted with an oligoester-(meth)acrylate as mentioned in (a)–(e) above of a low viscosity or if desired, mixed with monomers of other (meth)acrylate series of monoglycidyl ethers or solvents.

As the polymer emulsion used for forming the emulsion in the present invention, a polymer emulsion obtained by emulsion polymerization is preferable. For example, there may be used an oil-in-water type emulsion of vinyl acetate polymers, vinyl acetate copolymers styrene-butadiene copolymers, acryl polymers, acryl copolymers, vinyl chloride-vinylidene chloride copolymers, butadiene-acrylonitrile copolymers, vinyl chloride-vinyl acetate copolymers, or ethylene-vinyl acetate copolymers.

Preferable polymer emulsions are emulsions of acryl polymers, ethylene-vinyl acetate copolymers, acryl copolymers, vinyl acetate polymers, copolymers of vinyl acetate series, and vinyl chloride-vinyl acetate copolymers, for example, poly(acrylic acid ester), poly(methacrylic acid ester), copolymers of acrylic acid ester and methacrylic acid ester, copolymers of vinyl acetate and acrylic acid ester, copolymers of styrene and acrylic acid ester, polyvinyl acetate, copolymers of vinyl acetate and ethylene and copolymers of vinyl chloride and vinyl acetate.

The polymers in the emulsion may or may not have radical polymerizable functional groups in the main chain or side chain thereof.

The oligoester-(meth)acrylate is usually used in an amount of 0.1–200 parts by weight, preferred with 1–50 parts by weight, per 100 parts by weight of a solid matter in the polymer emulsion. When the oligoester-(meth)acrylate is mixed with the polymer emulsion in a form of emulsion, the amount is determined as an amount of the oligoester-(meth)acrylate in the emulsion.

The emulsion of the crosslinking type of the present invention may be prepared by adding gradually the oligoester-(meth)acrylate to the polymer emulsion with stirring, or adding gradually the polymer emulsion to the oligoester-(meth)acrylate to produce a uniform emulsion. Further, the emulsion of a crosslinking type of the present invention may be produced by forming an oil-in-water emulsion of the oligoester-(meth)acrylate and then mixing the resulting oil-in-water emulsion with the oil-in-water emulsion of a polymer emulsion. According to this method, the dispersion is simply produced and the resulting emulsion has a high storage stability.

The oligoester-(meth)acrylate can be made into an oil-in-water emulsion by adding water thereto in the presence of a surface-active agent with stirring and causing a phase reversion.

As a surface-active agent employed in the practices of this invention, there may be employed anionic surface-active agents such as fatty acid salts, higher alcohol sulfates, alkylbenzenesulfonates, alkylnaphthalenesulfonates, naphthalenesulfonic acid-formaldehyde condensates, dialkylsulfosuccinates, alkylphosphates, polyoxyethylenesulfates and the like; nonionic surface-active agents such as polyoxyethylenealkyl ether, polyoxyethylenealkylphenol ether, sorbitan fatty acid ester, polyoxyethylene sorbitan fatty acid ester, polyoxyethyleneacylester and the like; cationic surface-active agents such as alkylamine salts, quaternary ammonium salts, polyoxyethylene alkylamines and the like; and water soluble polymers such as polyvinyl alcohol. The above mentioned surface-active agents may also be used in combination. Among the above mentioned surface-active agents, non-ionic surface-active agents of HLB of at least 10 are preferred because they give a particularly stable emulsion.

The surface-active agent is usually used in an amount of 0.1–20% by weight, preferred with 1–10% by weight, based on the oligoester-(meth)acrylate.

The emulsion of a crosslinking type of the subject invention prepared by the method as mentioned above yields a composition in which the oligoester-(meth)acrylate and the polymer are uniformly mixed or mutually dissolved as water, the dispersion medium, evaporates. This is a special feature of the subject invention.

Crosslinking or curing of the emulsion according to the present invention may be conducted by applying an active energy ray or heating after evaporating a part or all of the water employed as the dispersion medium. As the active energy ray, there may be used ionizing radiation, electron beam, and ultraviolet rays.

When the crosslinking means is an electron beam or ionizable radiation, the crosslinking proceeds rapidly without adding any polymerization initiator, but when the crosslinking means is ultraviolet ray, a usual photoinitiator is usually employed, such as, for example, benzoin, its ethers such as methyl ether, ethyl ether, isopropyl ether, butyl ether, octyl ether and the like; carbonyl compounds such as diacetyl, benzil, benzophenone and the like; sulfur compounds such as diphenyl sulfide, dithiocarbamate and the like; α-chloromethyl naphthalene, and anthracene.

As ultraviolet ray sources, there may be mentioned sun light, a low pressure mercury lamp, a high pressure mercury lamp, a super high pressure mercury lamp, a carbon-arc lamp, a xenon lamp and LST device (Impuls Strahlungs Trocknung, supplied by Hildebrand Co. in West Germany). When the LST device is employed, the crosslinking can proceed without a photoinitiator.

When the crosslinking means is heating, a thermal initiator is used. As a thermal initiator, there may be mentioned azo compounds, such as azobisisobutyronitrile and the like; organic peroxides, such as ketone peroxides, hydroperoxides, alkyl peroxides, acryl peroxides, peroxy esters and the like; and inorganic peroxides, such as ammonium persulfate, potassium persulfate, hydrogen peroxide and the like.

The photoinitiator and the thermal polymerization initiator are used preferably in an amount of 0.001–10% by weight, more preferably 0.1–5% by weight based on a solid matter in the emulsion according to the present invention.

In usual, a polymerization initiator for a crosslinking emulsion containing an oligoester-(meth)acrylate is incorporated to the emulsion by emulsifying an oligoester-(meth)acrylate in which a polymerization initiator is dissolved in advance, but if it is desired to change the concentration and type of the polymerization initiator in the crosslinking emulsion, such change can be attained by adding a non-water soluble liquid polymerization initiator or a solution of a polymerization initiator in a non-water soluble solvent to an emulsion containing at least one oligoester-(meth)acrylate.

The emulsion of oil-in-water type according to the present invention may be used for paints, adhesives, ink, fiber treating agents, paper treating agents, leather treating agents and the like.

In the following there are given examples of the subject invention, reference examples and comparative examples. Unless otherwise specified where parts and percent are mentioned, they are parts and percent by weight.

REFERENCE EXAMPLE 1

Oligoester-acrylate emulsion A

Following the procedure of Reference Example 4 of Published Japanese Patent Laid Open No. 128088/1974, tetrahydrophthalic anhydride, trimethylol propane and acrylic acid (molar ratio of 1 : 2 : 4) were coesterified to obtain a reaction product. 60 parts of the above mentioned reaction product, 40 parts of trimethylol propane triacrylate were mixed to produce an oligoester-acrylate. 120 g. of the oligoester-acrylate was placed in a 500 ml beaker and dissolved by adding 6 g. of benzil.

To the oligoester-acrylate was gradually added 32 g. of a 25% aqueous solution of EMULGEN 935 (trade name, supplied by Kao-Atlas Co. Ltd., a nonionic surface-active agent of a polyoxyethylene nonylphenolether type, HLB 17.5), and 48 g. of a distilled water was gradually added thereto to obtain oligoester-acrylate emulsion A.

REFERENCE EXAMPLE 2

Oligoester-acrylate emulsion B

Repeating the procedure of Reference Example 1 except that benzoyl peroxide was used in place of benzil, there was obtained oligoester-acrylate emulsion B.

REFERENCE EXAMPLE 3

Oligoester-acrylate emulsion C

In a 500 ml. beaker was placed 120 g. of a reaction product obtained by coesterifying phthalic anhydride, diethylene glycol and methacrylic acid (molar ratio of 1 : 2 : 2) following the procedure of Reference Example 8 of Published Japanese Patent Laid Open No. 128088/1974, and 6 g. of benzoyl peroxide was added to dissolve the reaction product.

The subsequent emulsifying procedure was the same as that in Reference Example 1 to obtain oligoester-methacrylate emulsion C.

EXAMPLES 1 – 5

An oil-in-water emulsion of the crosslinking type produced by mixing a polymer emulsion and an oligoester-(methacrylate) emulsion as shown in Table 1 (infra) was poured into an aluminum plate and heated at 50° C for 2 hours and then at 110° C for one hour to evaporate water as a dispersion medium and form a film. The resulting film was irradiated by ultraviolet ray from a high pressure mercury lamp, National H 2000 TQ (trade name, supplied by Matsushita Denko K.K.) at a distance of 20 cm. for one minute to cause crosslinking.

The film thus crosslinked was soaked in acetone for 24 hours and the insoluble portion was filtered off by a glass filter and dried at 100° C for one hour to measure the insolubility rate. The determined rate was so large that it was clear that the polymer was crosslinked.

COMPARATIVE EXAMPLES 1 – 3

Repeated the procedure of Example 1 except that the oligoester-(meth)acrylate emulsion as a crosslinking agent was not used, a film was made and irradiated by ultraviolet ray. Then the insolubility rate in acetone was measured. Most of the film was dissolved in the acetone.

Table 1

|  | Polymer Emulsion I | Oligoester-(meth)acrylate emulsion II | Mixing ratio I/II | Film thickness (microns) | Insolubility rate in acetone (%) |
|---|---|---|---|---|---|
| Example 1 | Acryl type; PRIMAL C-72[a] | A | 80/20 | 800 | 82.3 |
| Example 2 | " | " | 90/10 | 700 | 65.0 |
| Example 3 | " | " | 95/5 | 500 | 50.4 |
| Example 4 | Vinyl acetate type; SUMIKA FLEX 130[b] | " | 80/20 | 1000 | 73.6 |
| Example 5 | Vinyl chloride-vinyl acetate type; VINYBLAN 386[c] | " | 80/20 | 900 | 59.2 |
| Comparative Example 1 | Acryl type; PRIMAL C-72[a] | — | — | 1500 | 2.0 |
| Comparative Example 2 | Vinyl acetate type; SUMIKA FLEX 130[b] | — | — | 500 | 0.3 |
| Comparative Example 3 | Vinyl chloride-vinyl acetate type; VINYBLAN 386[c] | — | — | 600 | 5.8 |

[a] Supplied by Nihon Acryl Kagaku K.K.: Emulsion of acryl series.
[b] Supplied by Sumitomo Kagaku Kogyo K.K.: Polyvinyl acetate emulsion.
[c] Supplied by Nisshin Kagaku Kogyo K.K.: Vinyl chloride-vinyl acetate copolymer emulsion.

EXAMPLES 6 – 9

An oil-in-water emulsion of a crosslinking type produced by mixing a polymer emulsion and an oligoester-(meth)acrylate emulsion as shown in Table 2 was poured into an aluminum plate and heated at 50° C for 2 hours and then at 110° C for one hour to evaporate water, the dispersion medium, and form a film.

The resulting film was heated at 150° C for 15 minutes to cause crosslinking, soaked in acetone for 24 hours followed by filtering the insoluble portion through a glass filter. The resulting insoluble portion was dried at 100° C for one hour and the insolubility rate in acetone was measured. The insolubility rate in acetone was so high as shown in Table 2 that the polymer was clearly crosslinked.

COMPARATIVE EXAMPLES 4 – 5

Repeating the procedure of Example 6 except that an oligoester-(meth)acrylate was not used as a crosslinking agent, the polymer emulsion as shown in Table 2 was made into a film and heated at 150° C for 15 minutes. And the insolubility rate in acetone was measured and it was observed that most of the film was dissolved.

Table 2

|  | Polymer Emulsion I | Oligoester-(meth)acrylate emulsion II | Mixing ratio I/II | Film thickness (microns) | Insolubility rate in acetone (%) |
|---|---|---|---|---|---|
| Example 6 | Acryl type; PRIMAL C-72[a] | B | 80/20 | 600 | 59.2 |
| Example 7 | " | C | " | 600 | 40.7 |
| Example 8 | Vinyl acetate type; SUMIKA FLEX 130[b] | B | " | 700 | 67.1 |
| Example 9 | Vinyl chloride-vinyl acetate type; VINYBLAN 386[c] | B | " | 500 | 47.5 |
| Comparative Example 4 | Acryl type; PRIMAL C-72[a] | — | — | 2000 | 0.4 |
| Comparative Example 5 | Vinyl acetate type; SUMIKA FLEX 130[b] | — | — | 1400 | 0.3 |

NOTE: [a], [b] and [c] are the same as those in Table 1.

EXAMPLES 10 – 15

An oil-in-water emulsion of a crosslinking type prepared by mixing a polymer emulsion and an oligoester-(meth)acrylate emulsion as shown in Table 3 was coated on a deoiled soft steel plate (JIS G-3141 SPCC-D) by a film applicator, dried for one day at room temperature, and heated at 100° C for 10 minutes to form a film. The resulting film was crosslinked by applying an ultraviolet ray with a high pressure mercury lamp, National H 2000 TQ (trade name, supplied by Matsushita Denko K.K.) at a distance of 20 cm. for one minute. Pencil hardness and adhesivity of the coated film thus crosslinked were measured, and the results are shown in Table 3. Both pencil hardness and adhesivity are good.

COMPARATIVE EXAMPLES 6 – 8

A polymer emulsion alone or an oligoester-(meth)acrylate emulsion alone as shown in Table 3 was coated on a deoiled soft steel plate (JIS G-3141 SPCC-D) as in Example 10 by using a film applicator, dried at room temperature for one day, and heated at 100° C for 10 minutes to form a film. In a way similar to Example 10, after irradiating the coated film with an ultraviolet ray, the pencil hardness and adhesivity were measured.

As is clear from Table 3, when a polymer emulsion was used alone, the adhesivity was good, but the pencil hardness was low, and when an oligoester-(meth)acrylate was used alone, the adhesivity was poor.

200 g. of a distilled water was added gradually with stirring by a homogenizing mixer at 3000 – 4000 r.p.m. when 130 g. of water was added, the viscosity decreased abruptly.

The speed of the mixer was decreased to 500 – 1000 r.p.m. and stirring continued. To the resulting oil-in- Table 3

|  | Polymer Emulsion I | Oligoester-(meth)acrylate emulsion II | Mixing ratio I/II | Film thickness (microns) | Pencil hardness | Adhesivity [c] |
|---|---|---|---|---|---|---|
| Example 10 | Acryl type; PRIMAL AC-3444[a] | A | 50/50 | 40 | 3H | 96 |
| Example 11 | " | A | 70/30 | 50 | 2H | 100 |
| Example 12 | " | A | 80/20 | 50 | H | 100 |
| Example 13 | " | A | 90/10 | 30 | H | 100 |
| Example 14 | Vinyl acetate type; SUMIKA FLEX 130[b] | A | 50/50 | 50 | 4H | 100 |
| Example 15 | " | A | 80/20 | 50 | 2H | 100 |
| Comparative Example 6 | Acryl type; PRIMAL AC-3444[a] | — | — | 20 | B | 100 |
| Comparative Example 7 | Vinyl acetate type; SUMIKA FLEX 130[b] | — | — | 40 | HB | 100 |
| Comparative Example 8 | — | A | — | 30 | 4H | 0 |

[a] Supplied by Nihon Acryl Kagaku K.K.: Emulsion of acryl series.
[b] Supplied by Sumitomo Kagaku Kogyo K.K.: Polyvinyl acetate emulsion.
[c] The coated film was cut to one hundred square portions by a knife, and a cellotape (a pressure sensitive adhesion tape) was pressed thereonto and immediately peeled. The number in the Table indicates that of square portions remaining on the soft steel plate without peeled off.

EXAMPLE 16

According to Reference Example 9 in published Japanese Patent Laid Open No. 128088/1974, phthalic anhydride, diethylene glycol and acrylic acid (molar ratio of 1:2:2) were coesterified to produce a polyester polyacrylate. 100 parts of said polyester polyacrylate were dissolved in 5 parts of benzoyl peroxide.

170 parts of PRIMAL C-72 were placed in a 500 ml. beaker, and 30 parts of the polyester polyacrylate containing the dissolved benzoyl peroxide as obtained above were gradually added thereto with stirring by a homogenizing mixer (6000 r.p.m.) and after the addition, the stirring was continued for further 10 minutes to obtain an emulsion of a cross-linking type.

The resulting emulsion was poured into an aluminum plate and heated at 50° C for 2 hours and then at 110° C for one hour to evaporate water, the dispersion medium, to produce a transparent film of 800 microns thick. The resulting film was heated at 150° C for 15 minutes for crosslinking, soaked in acetone for 24 hours. The insolubility rate in acetone was measured and found to be 46.0%, which is far larger than that obtained by using PRIMAL C-72 alone (Comparative Example 4).

EXAMPLES 17 – 24

100 g. of trimethylol propane triacrylate and 4 g. of EMULGEN 935 were placed in a 500 ml. beaker, and water trimethylol propane triacrylate emulsion was added 200 g. of PRIMAL C-72, as a polymer emulsion, and stirred for 5 hours (Example 17).

In a way similar to the above procedure, 100 g. of various polyol poly(meth)acrylate and 4 g. of various surface-active agents were placed in a 500 ml. beaker and 200 g. of a distilled water were added with stirring to form an oil-in-water polyol poly(meth)acrylate emulsion and then various polymer emulsions were added to the emulsion in an amount as shown in Table 4 (Examples 18 – 24).

The resulting emulsions do not cause any coagulate during a room temperature shelf-life or storage test for 2 months, nor do they separate and deposit polyol poly(meth)acrylates. They are stable emulsions of a crosslinking type.

Table 4 shows details of the emulsions.

Table 4

|  | Polyol poly(meth) acrylate | Surface-active agent[a] | Polymer emulsion Type[b] | Amount (g.) |
|---|---|---|---|---|
| Example 17 | Trimethylolpropane triacrylate | EMULGEN 935 | PRIMAL C-72 | 200 |
| Example 18 | " | " | PRIMAL AC-61 | " |
| Example 19 | " | " | PRIMAL C-72 | 500 |
| Example 20 | " | " | SUMIKA FLEX 130 | 200 |
| Example 21 | " | NEWCOL 568 | PRIMAL C-72 | " |
| Example 22 | " | EMULGEN 950 | " | " |
| Example 23 | Trimethylolpropane trimethacrylate | EMULGEN 935 | " | " |
| Example 24 | Diethyleneglycol dimethacrylate | " | " | " |

(a) "EMULGEN 935": Supplied by Kao-Atlas Co., Ltd., nonionic surface-active agent of polyoxyethylene nonylphenol ether series (HLB 17.5).
  "NEWCOL 568": Supplied by Nihon Nyukazai K.K., nonionic surface-active agent of polyoxyethylene nonylphenol ether series (HLB 15.2).
  "EMULGEN 950": Supplied by Kao-Atlas Co., Ltd., nonionic surface-active agent of polyoxyethylene nonylphenol ether series (HLB 18.2).
(b) "PRIMAL C-72": Supplied by Nihon Acryl Kagaku K.K., emulsion of acryl series.

"PRIMAL AC-61": Supplied by Nihon Acryl Kagaku K.K., emulsion of acryl series.
"SUMIKA FLEX 130": Supplied by Sumitomo Kagaku Kogyo K.K., emulsion of vinyl acetate.

EXAMPLES 25 – 34

100 g. of oligoester-acrylate No. 2 and 4 g. of EMAL A were placed in a 500 ml. beaker, and 120 g. of a distilled water were gradually added with stirring by a homogenizing mixer at 3000 – 4000 r.p.m. Until 80 g. of the distilled water were added, the mixture was butter-like, but when additional distilled water was added, the viscosity decreased abruptly.

The stirring was continued at a reduced speed 500 – 1000 r.p.m., and 200 g. of PRIMAL C-72, as a polymer emulsion, were added to the resulting oil-in-water oligoester-acrylate emulsion and stirred for 5 minutes (Example 25).

In a way similar to the above procedure, 100 g. of various oligoester-(meth)acrylates and 4 g. of various surface-active agent were placed in a 500 ml. beaker, and 120 g. of a distilled water were added to the mixture with stirring by a homogenizing mixer to form an oil-in-water oligoester-(meth)acrylate emulsion, and various polymer emulsions were added thereto in an amount as shown in Table 5 (Examples 26 – 34).

The emulsions thus produced do not coagulate during a room temperature shelf-life or storage test for 2 months, nor do they separate and deposit oligoester-(meth)acrylates. The emulsions are stable emulsions of a crosslinking type.

"PRIMAL AC-61": See the foot note (b) of Table 4.
"SUMIKA FLEX 130": See the foot note (b) of Table 4.

REFERENCE EXAMPLE 4

Preparation of an oligoester acrylate emulsion 120 g. of the oligoester acrylate as obtained in Reference Example 1 was placed in a 500 ml. beaker, and 6 g. of benzoyl peroxide and 6 g. of EMULGEN (trade name, supplied by Kao-Atlas Co. Ltd., nonionic surface-active agent of a polyoxyethylene nonyl phenol ether series: HLB 17.5) were added and dissolved.

Then, 74 g. of a distilled water was gradually added to the oligoester acrylate with stirring to produce an oligoester acrylate emulsion.

EXAMPLE 35

80 parts of an adhesive of a ethylene-vinyl acetate series of an emulsion type ("Denka EVA TEX #60", trade name, supplied by Denki Kagaku K.K.) and 20 parts of an oligoester acrylate emulsion as obtained in Reference Example 4 were mixed to produce an adhesive composition of an emulsion type.

Test pieces (100 mm. in length and 25 mm. in width) cut out of a flat slate of 3 mm thick (supplied by Asano Slate K.K.) were coated with the above mentioned adhesive composition without treating the surfaces of the test pieces, and adhered each other and stood in an oven at 120° C for 30 minutes to dry and cure.

The resulting matter was subjected to a tensile shearing test according to JIS K-6850, and the mother piece Table 5

| Examples | Oligoester-(meth)acrylate[a] | Surface-active agent[b] | Polymer emulsion type[c] | Amount (g.) |
|---|---|---|---|---|
| 25 | No. 2 | EMAL A | PRIMAL C-72 | 200 |
| 26 | " | " | PRIMAL AC-61 | " |
| 27 | " | " | PRIMAL C-72 | 500 |
| 28 | " | " | SUMIKA FLEX 130 | 200 |
| 29 | " | EMAL 200 | PRIMAL C-72 | " |
| 30 | " | OS Soap | " | " |
| 31 | No. 1 | EMAL A | " | " |
| 32 | No. 3 | " | " | " |
| 33 | Trimethylolpropane triacrylate | " | " | " |
| 34 | No. 2 | ACETAMIN 24 | " | " |

(a) "Oligoester-(meth)acrylate No. 1": Reaction product of coesterification of tetrahydrophthalic anhydride, trimethylol propane and acrylic acid as obtained in Reference Example 1.
"Oligoester-(meth)acrylate No. 2": A mixture of 60 parts by weight of Oligoester-(meth)acrylate No. 1 and 40 parts by weight of trimethylol propane triacrylate.
"Oligoester-(meth)acrylate No. 3": Reaction product of coesterification of phthalic anhydride, diethylene glycol and methacrylic acid as obtained in Reference Example 3.
(b) "EMAL A": Supplied by Kao-Atlas Co., Ltd., lauryl alcohol sulfate ammonium salt (an anionic surface-active agent).
"EMAL 20C": Supplied by Kao-Atlas Co., Ltd., polyoxyethylene alkyl sulfate sodium salt (an anionic surface-active agent).
"OS Soap": Supplied by Kao-Atlas Co., Ltd., potassium oleate soap (an anionic surface-active agent).
"ACETAMIN 24": Supplied by Kao-Atlas Co., Ltd., lauryl amine acetate (a cationic surface-active agent).
"PRIMAL C-72": See the foot note (b) of Table 4.

was broken at 41.3 Kg/cm². When the oligoester acrylate emulsion was not used, the tensile shearing strength was 30.9 Kg/cm².

EXAMPLE 36

As an adhesive of a vinyl acetate series of an emulsion type, 80 parts of Nikasol CL-102B (supplied by Nihon Carbide K.K.) was used and mixed with 20 parts of an oligoester acrylate emulsion as obtained in Reference Example 4 to obtain an adhesive composition of an emulsion type. The resulting adhesive composition was tested in a same way as in Example 36 and it was found that the mother piece was broken at 42.5 Kg/cm². When the oligoester acrylate emulsion was not used, the tensile shearing strength was 31.6 Kg/cm².

We claim:
1. An emulsion of a crosslinking type which comprises an oligoester-(meth)acrylate having at least two (meth)acryloyl groups per molecule, a molecular weight of not more than 1000 per one (meth)acryloyl group, and a boiling point at normal atmospheric pressure of at least 200° C, and
a polymer emulsion of an oil-in-water type.

2. A process for producing an emulsion of a crosslinking type which comprises mixing with stirring an oligoester-(meth)acrylate having at least two (meth)acryloyl groups per molecule, a molecular weight of not more than 1000 per one (meth)acryloyl group, and a boiling point at normal atmospheric pressure of at least 200° C, and a polymer emulsion of an oil-in-water type.

3. A process for producing an emulsion of a crosslinking type which comprises mixing an oligoester-(meth)acrylate in a form of an oil-in-water emulsion having at least two (meth)acryloyl groups per molecule, a molecular weight of not more than 1000 per one (meth)acryloyl group, and a boiling point at a normal pressure of at least 200° C, and a polymer emulsion of an oil-in-water type.

4. An emulsion of a crosslinking type according to claim 1 in which the oligoester-(meth)polyacrylate is a polyester poly(meth)acrylate.

5. An emulsion of a crosslinking type according to claim 1 in which the polymer emulsion is an emulsion of ethylene-vinyl acetate copolymer.

6. An emulsion of a crosslinking type according to claim 1 in which 0.1 - 200 parts by weight of the oligoester-(meth)acrylate is used per 100 parts by weight of solid matter in the polymer emulsion.

7. An emulsion of a crosslinking type according to claim 1 in which 1 - 50 parts by weight of the oligoester-(meth)acrylate is used per 100 parts by weight of solid matter in the polymer emulsion.

8. An emulsion of a crosslinking type according to claim 1 in which the oligoester-(meth)acrylate is emulsified with a nonionic surface-active agent having HLB of at least 10.

9. An emulsion of a crosslinking type according to claim 1 in which a molecular weight of the oligoester-(meth)acrylate per one (meth)acrylate group is 90 - 1000.

10. An emulsion of a crosslinking type according to claim 1 in which a molecular weight of the oligoester-(meth)acrylate per one (meth)acrylate group is 200 - 600.

* * * * *

UNITED STATES PATENT AND TRADEMARK OFFICE
CERTIFICATE OF CORRECTION

PATENT NO. : 4,101,493
DATED : July 18, 1978
INVENTOR(S) : Teruo Nakagawa et al

It is certified that error appears in the above-identified patent and that said Letters Patent are hereby corrected as shown below:

Column 2, line 18, "mixture" should read -- mixing --

Column 3, line 14, "difficult" should read -- different --

Column 4, line 29, "as" should read -- an --

Column 7, line 9, "and" (first occurrence) should read -- acid --

Columns 7 and 8, Formulas 2 and 7 should read:

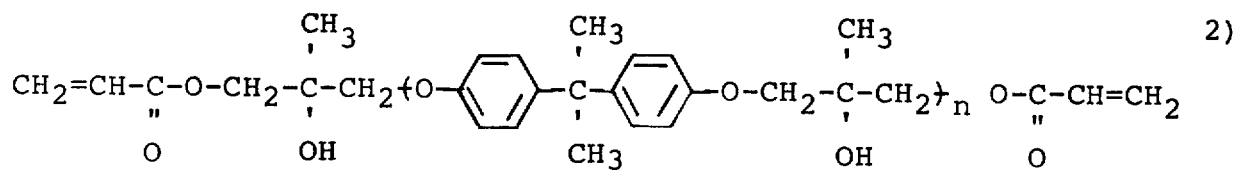

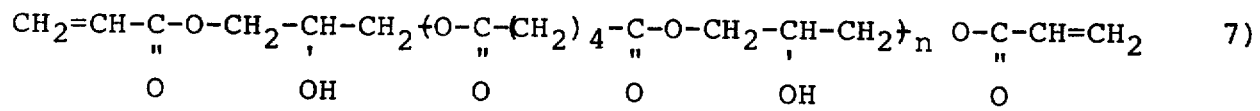

UNITED STATES PATENT AND TRADEMARK OFFICE
CERTIFICATE OF CORRECTION

PATENT NO. : 4,101,493
DATED : July 18, 1978
INVENTOR(S) : Teruo Nakagawa et al

It is certified that error appears in the above-identified patent and that said Letters Patent are hereby corrected as shown below:

Column 9, line 47, the first line of the equation should read:

$$-- (n+1)R(OH)_2 + nR'(NCO)_2 \quad --$$

Column 11, line 25, after "The" the word -- low -- should be inserted

Column 11, last line, "are" should read -- as --

Column 12, line 14, "of" (second occurrence) should read -- or --

Column 14, line 44, under Example 3, "-acrylate" should read -- methacrylate --

Column 19, under Table 5, third column, "EMAL 200" should read -- EMAL 20C --

Column 19, last line, before "PRIMAL C-72", --(c)-- should be inserted

Signed and Sealed this

Thirteenth Day of February 1979

[SEAL]

Attest:

RUTH C. MASON
Attesting Officer

DONALD W. BANNER
Commissioner of Patents and Trademarks